US009878371B2

(12) United States Patent
Varetti

(10) Patent No.: US 9,878,371 B2
(45) Date of Patent: Jan. 30, 2018

(54) POWDER DISPENSER FOR MAKING A COMPONENT BY ADDITIVE MANUFACTURING

(71) Applicant: GE AVIO S.r.l., Rivalta di Torino (IT)

(72) Inventor: Mauro Varetti, Collegno (IT)

(73) Assignee: GE AVIO S.R.L., Rivlata di Torino (IT)

( * ) Notice: Subject to any disclaimer, the term of this patent is extended or adjusted under 35 U.S.C. 154(b) by 19 days.

(21) Appl. No.: 14/933,435

(22) Filed: Nov. 5, 2015

(65) Prior Publication Data
US 2016/0129502 A1 May 12, 2016

(30) Foreign Application Priority Data
Nov. 7, 2014 (IT) ............... TO2014A0925

(51) Int. Cl.
B22F 3/105 (2006.01)
B29C 31/02 (2006.01)
B33Y 30/00 (2015.01)
B29C 31/04 (2006.01)
B29C 64/20 (2017.01)
B29C 64/153 (2017.01)

(52) U.S. Cl.
CPC ............ B22F 3/1055 (2013.01); B29C 31/02 (2013.01); B29C 31/044 (2013.01); B29C 64/20 (2017.08); B33Y 30/00 (2014.12); B22F 2003/1056 (2013.01); B29C 64/153 (2017.08); Y02P 10/295 (2015.11)

(58) Field of Classification Search
CPC . B22F 3/1055; B22F 2003/1056; B33Y 30/00
USPC ..................... 425/375, 174.4, 447
See application file for complete search history.

(56) References Cited

U.S. PATENT DOCUMENTS

| 3,815,527 A | | 6/1974 | Dobbins | |
| 4,834,586 A | * | 5/1989 | Depew | B65G 53/24 406/152 |
| 5,078,090 A | * | 1/1992 | Richman | A21C 9/04 118/13 |
| 2002/0113080 A1 | * | 8/2002 | Beal | B01F 3/18 222/1 |

(Continued)

FOREIGN PATENT DOCUMENTS

| DE | 199 28 245 A1 | 1/2001 |
| DE | 10 2006 023 485 A1 | 11/2007 |
| WO | 2010/007396 A1 | 1/2010 |

OTHER PUBLICATIONS

Italian Search Report dated Jul. 1, 2015 from corresponding Italian Patent Application No. TO20140925, 2 pages.

(Continued)

Primary Examiner — Nahida Sultana
(74) Attorney, Agent, or Firm — Ohlandt, Greeley, Ruggiero & Perle, LLP

(57) ABSTRACT

A powder dispenser (14) has a vertical channel (55), which, at the top, is adapted to communicate with a tank for receiving the powder and inferiorly ends at an opening (26), which is elongated along a horizontal direction and comprises an outlet portion (51) for letting the powder fall; the dispenser further has a shutter device (50) for varying the length of the outlet portion (51) with respect to the total length of the opening (26) along its horizontal axis (36).

10 Claims, 5 Drawing Sheets

(56) References Cited

U.S. PATENT DOCUMENTS

| | | | | |
|---|---|---|---|---|
| 2002/0181998 | A1* | 12/2002 | Petit | A45D 33/02 401/289 |
| 2008/0069596 | A1* | 3/2008 | Katsuyama | G03G 15/0874 399/262 |
| 2008/0150192 | A1* | 6/2008 | Perret | B22F 3/1055 264/308 |
| 2009/0286007 | A1 | 11/2009 | Brancher | |
| 2013/0216703 | A1* | 8/2013 | Stillwell | B29C 31/044 427/133 |
| 2014/0242208 | A1* | 8/2014 | Elsworthy | B29C 31/042 425/375 |
| 2014/0302188 | A1* | 10/2014 | Rix | B29C 67/0077 425/174.4 |
| 2015/0023742 | A1* | 1/2015 | Schmalholz | B29B 7/66 406/49 |
| 2016/0368215 | A1* | 12/2016 | Miyano | B22F 3/105 |

OTHER PUBLICATIONS

Italian Written Opinion dated Jul. 1, 2015 from corresponding Italian Patent Application No. TO20140925, 5 pages.

\* cited by examiner

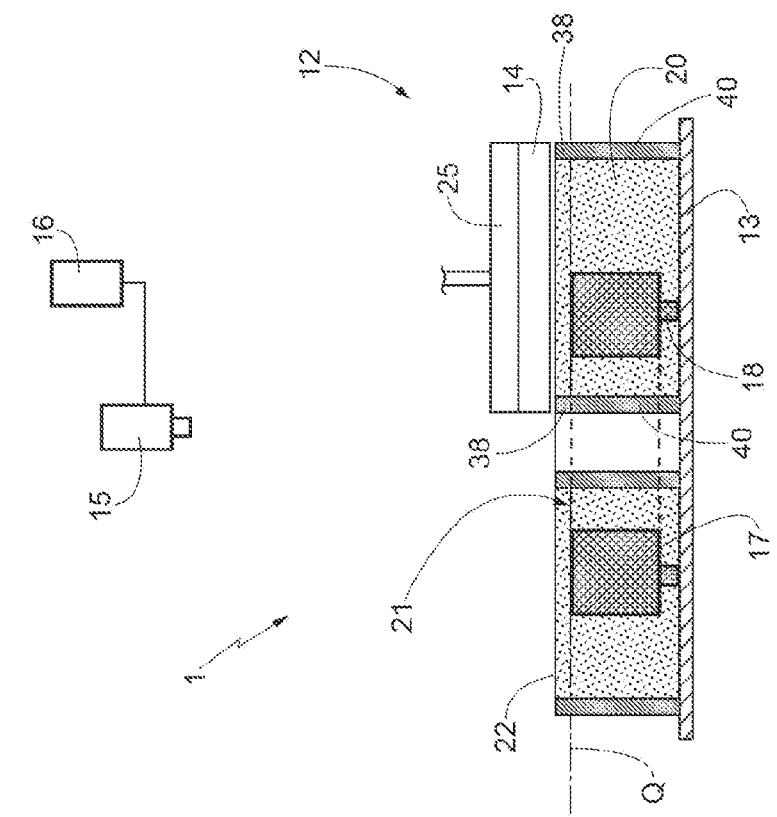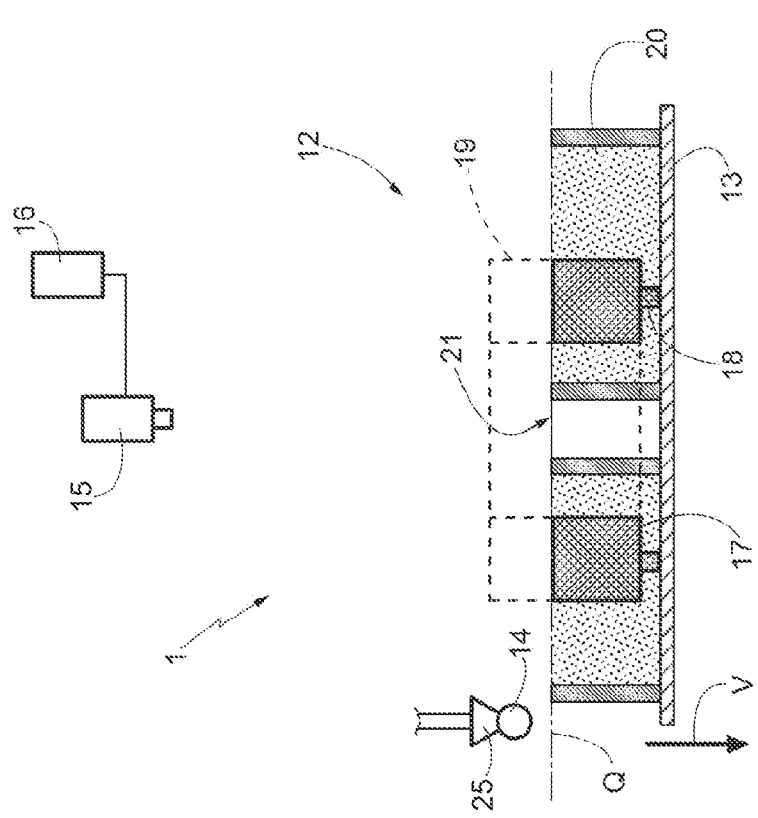

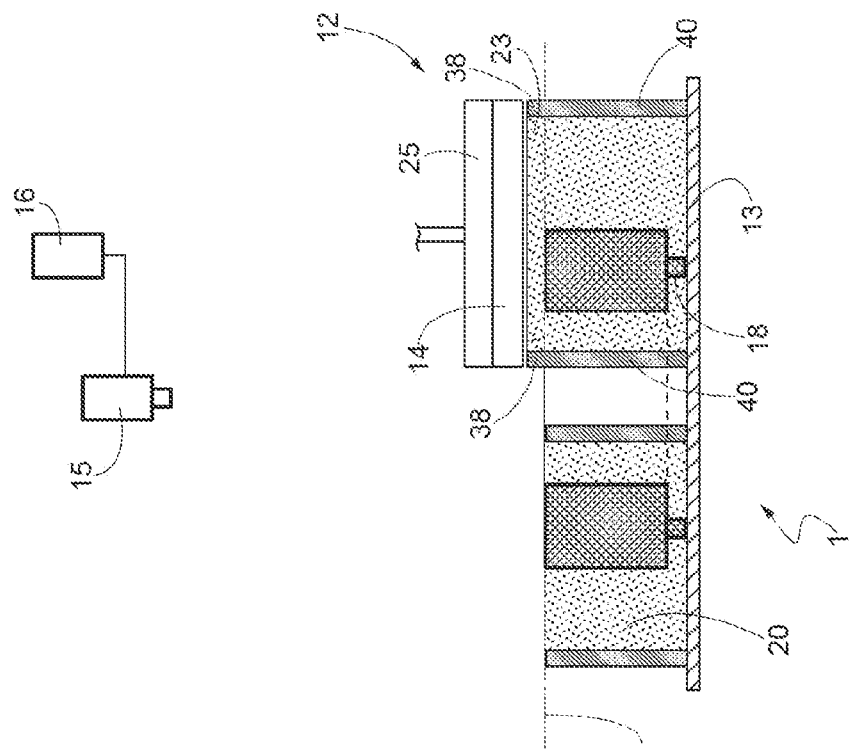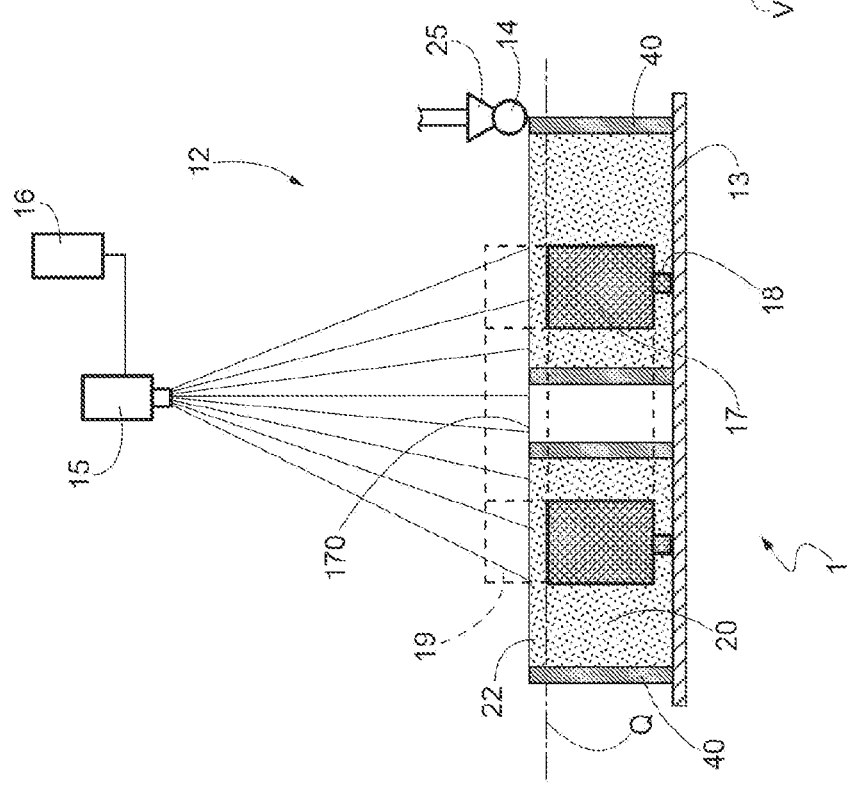

POWDER DISPENSER FOR MAKING A COMPONENT BY ADDITIVE MANUFACTURING

The present invention relates to a powder dispenser for making a component by additive manufacturing.

This application claims the priority to foreign application, Italy TO2014A000925, filed on Nov. 7, 2014.

BACKGROUND OF THE INVENTION

As it is known, additive manufacturing techniques involve the repetition of cycles, during which successive horizontal sections of the component to be made are formed. In particular, at the beginning of each cycle, a layer of powder is deposited by means of a dispenser, which is able to translate horizontally. This layer of powder has a substantially constant thickness and the powder has the same composition as the component to be made. After the layer of powder has been deposited, specific area thereof are melted through the scanning of a focused energy beam, typically a laser beam or an electron beam. In those areas where the powder is melted, a continuous, solid structure is formed, which defines a corresponding horizontal section of the component. These areas are selected by a control unit according to a mathematical model, which represents the geometry and the dimensions of the component to be made.

Once all the cycles have ended, the powder remaining around the component that has been formed is removed.

In the process described above, the powder is deposited on a support of the platform type, which is lowered in each cycles, after the melting step has ended, by a quantity equalling the thickness of the layer of powder deposited. In this way, the part of the component that has already been formed is lowered as well, so as to move on to the deposit step of the following cycle.

The powder deposited in the first cycle covers the entire platform, which hence defines the base of the entire volume of powder that is deposited in the different cycles. However, the final component obtained by this process occupies a very small part of said volume, for example 10%; therefore, a large quantity of powder is necessary for each component to be made.

Even though the residual powder is recovered, known solutions of the type described above are scarcely satisfactory, since the large quantity of powder needed leads to the use large containers for the storage thereof and to relative great amounts of time spent for the deposit steps carried out during the procedure.

Patent application US2009286007A1 relates to an additive manufacturing process, during which at least one barrier or containment wall is made, so as to define a confined working space where the powder remains enclosed. These barriers are formed in a progressive manner, layer by layer, just like the component being formed, by melting strips of powder through the same laser beam of the machine, as soon as the dispenser has deposited said powder.

However, this solution is not completely satisfactory either.

As a matter of fact, known dispensers let the powder fall through a horizontal slit with a fixed size, which depends on the specific application. With a slot having a fixed size, it is impossible for operators to adjust the dispensing of powder according to the working space. Indeed, US2009286007A1 shows a working space basically having a variable length, so that the part of the powder coming from the ends of the slit falls outside the working space, especially when the dispenser is located in the areas of the working space having a smaller length.

Therefore, even in this case, part of the deposited powder is actually unnecessary to carry out the process.

SUMMARY OF THE INVENTION

The object of the present invention is to provide a powder dispenser for making a component by additive manufacturing, which can solve the problems discussed above in a simple and cost-effective manner.

According to the present invention, there is provided a powder dispenser for making a component by additive manufacturing, as defined in claim 1.

BRIEF DESCRIPTION OF THE DRAWINGS

The present invention will be best understood upon perusal of the following detailed description of a preferred embodiment, which is provided by way of example and is not limiting, with reference to the accompanying drawings, in which:

FIGS. 2 to 5 are diagrams showing, in a cross section, some steps of the additive manufacturing process carried out by means of the powder dispenser of FIG. 1;

DETAILED DESCRIPTION OF THE INVENTION

Figure 1:
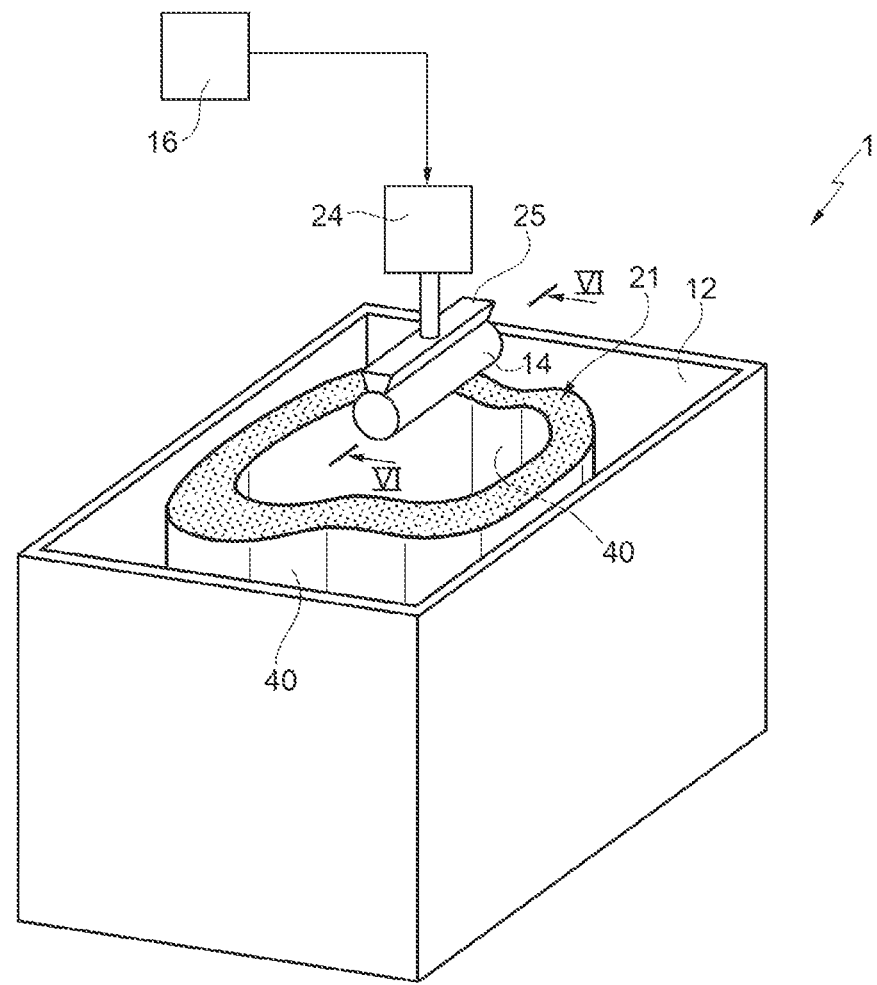
FIG. 1 is a diagram showing, in perspective, a preferred embodiment of the powder dispenser for making a component by additive manufacturing according to the present invention.

In FIGS. 1 to 5, reference number 1 indicates, as a whole, a (partially and schematically shown) machine for making a component starting from powder, in particular metal powders, by an additive manufacturing technique, namely a manufacturing technique of the type "layer by layer". These layer-by-layer manufacturing techniques are known and are mentioned in printed materials with different acronyms, for example acronyms such as "Direct Laser Forming" (DLF), "Direct Metal Laser Sintering" (DMLS), "Selective Laser Melting" (SLM), o "Electron Beam Melting" (EBM).

The composition of the powder is the same as that of the component to be formed. In particular, in the aeronautical field, people commonly use titanium alloys or titanium-aluminium alloys, for example an alloy known with the abbreviation Ti6-4 or Ti-6Al-4V (having 6% of aluminium and 4% of vanadium). As far as titanium alloys are concerned, the temperatures needed to obtain the melting of the powder can reach up to 180° C., depending on the particular alloy used.

The machine 1 comprises a working chamber 12 (FIG. 1), which has a base plate or platform 13, commonly known as "starting platform", where the first layer of powder is deposited.

The base plate 13 is operated in a manner that is not shown herein, so as to be able to progressively translate downwards along the vertical direction (arrow V) in response to orders of a control unit 16. Obviously, the base plate 13 must be made of a material that is able to resist the high temperatures needed to melt the powder.

The machine 1 further comprises a dispenser 14 described in detail hereinafter, for depositing the powder according to successive layers overlapping each other (two of them are indicated by reference numbers 22 and 23 in FIGS. 3 and 5, respectively).

The machine 1 further comprises an emitter or gun 15 to emit an energy beam pointing downwards, for example a focused electron beam or a focused laser light beam, so as to obtain the melting or the sintering of predefined areas of powder; in other words, the emitter 15 is activated and controlled by the control unit 16 so as to locally melt each layer of powder, in those areas that actually need to be formed and solidified.

Generally speaking, the laser is used for layers of powder having a thickness up to 40 µm, whereas the electron beam is used for a thickness up to 180 µm.

The emitter 15 and the base plate 13 are preferably movable with respect to each other, so as to carry out the scanning of the energy beam (FIG. 4) on the top surface of each layer of powder. As an alternative to or in combination with this relative movement, a system of motor.driven deflectors can be provided, so as to deflect the energy beam onto the desired areas.

Furthermore, the machine 1 can comprise a system (not shown) for generating a vacuum in the chamber 12 and/or a system (not shown) for injecting a jet of inert gas (for example argon or helium) into the chamber 12 towards the melting area, for example to protect the material being melted against oxidation.

The selection of the areas to be melted is based on a three-dimensional mathematical model previously generated and corresponding to the shape and dimensions desired for the component to be formed. For example, the three-dimensional model can be generated by means of a computer assisted design (CAD) software and transferred into the control unit 16 in the form of "file". The three-dimensional model is stored in the control unit 16 and is divided into overlapping horizontal levels, each associated with a relative horizontal section of the component to be made. As mentioned above, each horizontal section is formed by locally melting corresponding areas of the layer of powder that has lust been deposited.

FIG. 2 schematically shows the beginning of a cycle in an intermediate instant of the process for manufacturing a component having, in particular, an annular shape. In the instant of FIG. 2, we assume that, by means of a series of previous cycles, a lower portion 17 of the component as well as a series of pedestals 18 have already been formed. The pedestals 18 are defined in the aforesaid three-dimensional model as well and are made in the chamber 12 in order to keep the component fixed to the plate 13 during the process and, at the same time, to space the portion 17 apart from the plate. 13. The pedestals 18 will be removed once the manufacturing process ends.

An upper portion 19 still to be formed is indicated in FIGS. 2 and 4 with a broken line. The already formed portions 17, 18 are surrounded by a mass of residual powder 20, which was previously deposited layer by layer but was not subject to melting.

Preferably, the powder has a grain size ranging from 20 to 150 µm. The choice of the grain size is a compromise among different needs: having a high production rate (which would require powder with a greater grain size); having a good size precision and a good homogeneity in the structure of the component to be made; being able to easily empty possible cavities and/or pores of the component from residual powder 20 at the end of the forming process. In particular, a powder is used which is obtained by gas atomization processes, namely processes able to form grains with a substantially spherical shape.

The portion 17 and the surrounding residual powder 20 define, at the top, a surface 21 that, at the beginning of the cycle, is arranged a fixed reference height (line Q) with respect to the height position of the dispenser 14 by adjusting the height of the base plate 13.

After the base plate 13 has been positioned, the dispenser 14 is operated by an actuator assembly 24 (schematically shown in FIG. 1), so as to horizontally move above the surface 21. In particular, the assembly 24 has features that allow it to move the dispenser 14 with any trajectory on a horizontal plane and to rotate the dispenser 14 about a vertical axis. In this way, if the component to be formed has an elongated or annular shape in its plan view, the unit 16 can control the assembly 24 in such a way that the trajectory of the dispenser 14 follows this shape.

The dispenser 14 is supplied with powder coming from a main tank (not shown) and, as you can see in FIG. 3, it is controlled so as to dispense a layer of powder 22 onto the surface 21 during its movement. The dispenser 14 preferably comprises a secondary tank 25, which receives the powder form the main tank, acts as a buffer and is used to measure out the powder needed for one cycle.

Figure 6:
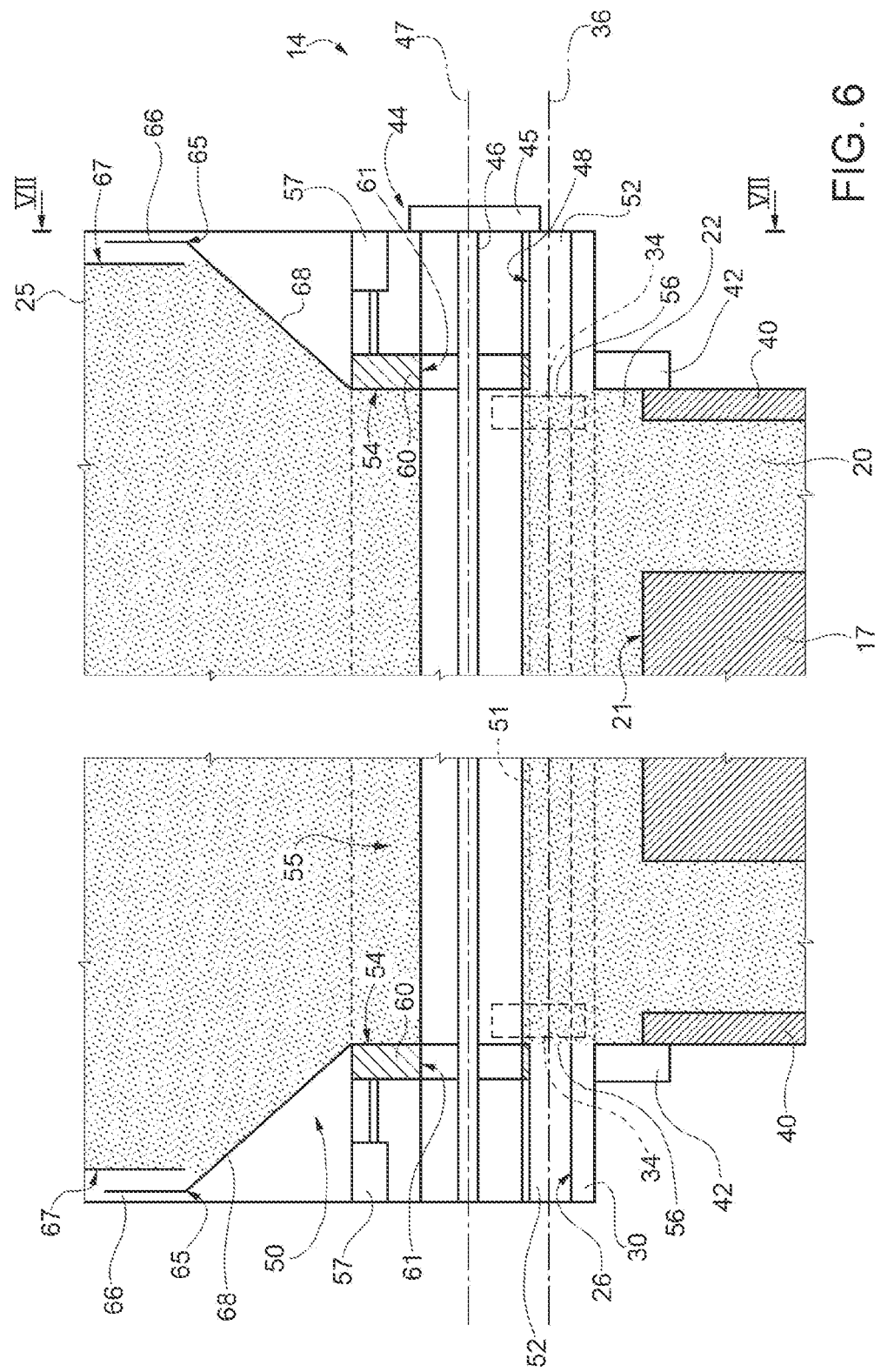
FIG. 6 is a simplified cross section, on a larger scale, according to a vertical cross section plane indicated by line VI-VI of FIG. 1.
Figure 7:
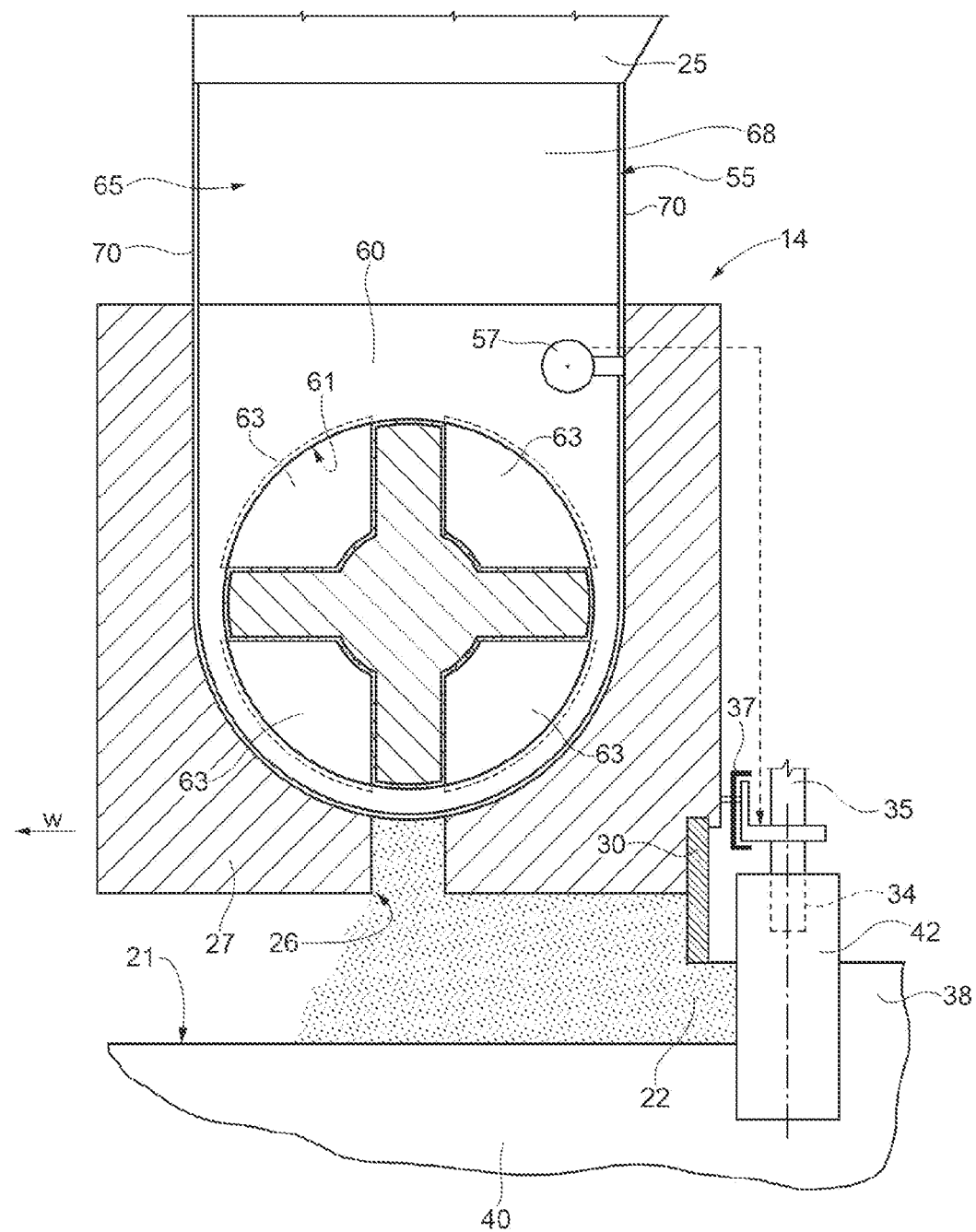
FIG. 7 is a simplified cross section, on a larger scale, according to line VII-VII of FIG. 6.

With reference to FIG. 7, the dispenser 14 comprises a lower wall 27 having a slit 26, through which the powder falls. The slit 26 is elongated along a horizontal axis 36 (FIG. 6), namely it has an axial length that is greater than the size of the slit 26 along a horizontal direction orthogonal to the axis 36. The slit 26 is oriented by the assembly 24 about a vertical axis, so that the axis 36 is always substantially orthogonal to she trajectory and to she advancing direction W of the dispenser 14.

The dispenser 14 further comprises at least one levelling element 30, for example a doctor blade, which is parallel to the slit 26 and is arranged downstream of the slit 26, considering the advancing direction W imposed by the assembly 24 on the dispenser 14. The levelling element 30 projects downwards with respect to the lower wall 27, so as to pass on the powder that has lust fallen and level the layer of powder. By so doing, the layer of powder gains a substantially uniform thickness (which has deliberately been exaggerated in the figures for the sake of greater clarity).

According to an alternative that is not shown herein, the levelling element 30 is separate from the dispenser 14 and is operated in an independent manner so as to follow the dispenser 14 along the advancing direction. However, this alternative is not the preferable one, as it tends to make the system more complicated and slow.

Preferably, the dispenser 14 further comprises two emitters 34, which are pointing downwards and are designed so as to emit respective energy beams, for example laser light beams. In particular, laser light is transported to the emitters 34 by means of respective optical fibres 35.

The emitters 34 are arranged downstream of the levelling element 30, considering the advancing direction W, and are aligned with as well as spaced apart from each other along a direction that is parallel to the axis 36 of the slit 26 and to the levelling element 30. The distance between the two emitters 34 in a direction parallel to the axis 36 is greater than the width of the component to be formed and is adjustable, as it will be apparent in detail below.

During the movement of the dispenser 14 above the surface 21, the emitters 34 can be fixed with respect to the body of the dispenser 14 and to the levelling element 30, or they can be operated in a way that is not shown herein, so as to carry out an oscillating movement and obtain a scanning of the energy beam along the side edges of the layer of powder 22.

As shown in FIGS. 3 and 5, as soon as the levelling element 30 has passed to form the layer of powder 22, the emitters 34 are used to obtain the melting or the sintering of the powder along the aforesaid side edges, namely on opposite side of the component that is being formed. The melted powder of the two energy beams, by solidifying, forms two strips of compact material 38, which are substantially parallel to the advancing trajectory of the dispenser 14. In the example shown, the two strips 38 define respective rings on the inside and, respectively, on the outside of the layer of powder 22.

The proximity of the emitters 34 to the levelling element 30 allows the strips 38 to solidify immediately after the powder has been deposited. In an alternative solution that is not shown herein, in order to form the strips 38, it is also possible to use the energy beam of the emitter 15 instead of providing the emitters 34. With this alternative solution, the emitter 15 is preferably movable, so as to be able to follow the movement of the levelling element 30, melt the powder as soon as the latter has been levelled, and prevent the levelling element 30 from coming between the emitter 15 and the powder to be melted.

During the solidification, the two strips 38 are joined to the ones arranged under them, which were made in the previous cycles. The progressive overlapping of the strips 38 of solidified material, cycle after cycle, forms two barriers or containment walls 40 (FIGS. 1 and 6), which are arranged on opposite side of the portion 17 and extend upwards from the base plate 13. In other words, the two barriers 40 delimit a working space, which receives the component being formed and the residual powder 20. The volume of the working space clearly is smaller than the one of the chamber 12, so that this solution leads to evident savings in terms of powder compared to the prior art, wherein no containment walls are provided.

With reference to FIGS. 6 and 7, the dispenser 14 advantageously further comprises two rollers 42 with vertical rotation axes. These figures are schematic representations, so that the sizes and proportions shown therein for the rollers 42 might not correspond to reality. In particular, the rollers 42 might be defined by simple pins having a diameter that is smaller than the one shown in the figures.

The rollers 42 project downwards with respect to the levelling element 30, rotate in an idler manner 62 the respective vertical rotation axes and are each arranged beside a relative emitter 34 in a direction parallel to the axis 36. Along this direction, the rollers 42 are arranged in positions that are more on the outside compared to the emitters 34 and are such as to make the rollers 42 substantially tangent to the outer surfaces of the barriers 40. In this way, as the dispenser 14 moves forward, the rollers 42 roll on the barriers 40 and fulfil a proper centering function, so as to cause the strips 38 of each layer of powder to precisely overlap the ones arranged under them and formed in the previous cycles.

Each of the two rollers 42 is arranged in fixed position with respect to a respective emitter 34 and forms with the latter a movable apparatus 37, which can slide parallel to the axis 36 with respect to the levelling element 30 and to the body of the dispenser 14. According to a variant that is not shown herein, only of the two apparatuses 37 is axially movable, whereas the other one is axially fixed with respect to the levelling element 30 and is arranged at an end of the dispenser 14.

Still with reference to FIGS. 6 and 7, the dispenser 14 preferably comprises an adjusting device 44 to change the quantity of powder that is caused to fall through the slit 26. In particular, in the example shown, the adjusting device 44 is defined by a blade delivering device having a motor 45 (schematically shown) and a blade rotor 46, which extends along an axis 47 parallel to the axis 36 of the slit 26, is housed in a seat 48 of the body of the dispenser 14, and is operated by the actuator 45 so as to rotate 62 the axis 47. The speed of rotation is variable and this variation permits an adjustment of the quantity of powder delivered. At the same time, the rotor 46 helps the powder move downwards towards the slit 26.

According to an advantageous variant, which is not shown herein, the dispenser 14 has no rotors, so that the powder moves downwards towards the slit 26 merely due to gravity. In this case, the adjusting device 44 can be defined by one or more valves or by a shutter system for varying the width of the slit along the advancing direction W and/or for varying the opening times of the slit 26.

According to a further variant, which is not shown herein, the slit 26 is made up of a discontinuous opening, in particular a series of holes. The passage of the levelling element 30 levels the quantity of powder deposited by each hole on the surface 21, so as the define the constant height of the layer of powder 22.

According to the present invention, as shown on FIG. 6, the dispenser 14 comprises a shutter device 50, which is designed so as to let the powder all exclusively through a portion 51 of the slit 26 and so as to vary the length of the portion 51. In other words, the portion 51 defines the actual outlet for the powder: the remaining part of the slit 26 is indicated by reference number 52, is not crossed by powder and is defined by the two opposite ends of the slit 26.

According to the preferred embodiment shown, the device 50 comprises two surfaces 54, which are transverse to the axis 47, face each other so as to define the sides of a vertical channel 55, and are shaped so as to guide the powder from the side ends of the tank 25 up to the end points 56 of the portion 51. At least one of the surfaces 54 is movable along the axis 47 so as to adjust the position of the corresponding end point 56. In this way, the distance between the surfaces 54 and, therefore, the length of the portion 51 is varied.

In particular, both surfaces 54 are movable with respect to the body of the dispenser 14. In order to move the surfaces 54 with respect to each other, the device 50 comprises an actuator assembly 57, which is controlled by the unit 16 and, in particular, is defined by two actuators, which are adapted to more the surfaces 54 in an independent manner. According to an alternative solution, which is not shown herein, the assembly 57 comprises one single actuator and a transmission, for example a screw-thread transmission.

If the dispenser 14 is provided with the emitters 34 and/or with the rollers 42, the position of each apparatus 37 is fixed with respect to the one of the adjacent surface 54. In other words, a movement of each surface 54 along the axis 47 must correspond to a similar translation of the respective apparatus 37, so as to always keep the rollers 42 aligned with the corresponding surfaces 54 in a direction parallel to the advancing direction W.

As a consequence, the adjustment of the position of the apparatuses 37 in a direction parallel to the axis 36 is synchronized with the adjustment of the position of the surfaces 54 along the axis 47 by means of a system that is schematically shown with a broken line in FIG. 7. This system is defined, for example, by a suitable mechanical transmission or by an assembly consisting of a further actuator means and of a control unit, which controls the actuator means so as to cause it to be synchronized with the assembly 57.

As you can see in FIGS. 6 and 7, in particular, the device 50 comprises two plates 60, which define a part of the surfaces 54, are axially guided by the inner surface of the seat 48 and are operated by the assembly 57. The plates 60 separate the channel 55 from the axial ends of the seat 48 so as to prevent powder from leaking out, are angularly fixed 62 the axis 47, and have respective axial holes 61, which are engaged by the rotor 46 in an axially rotary manner. The spaces between the rotor 46 and the circular edge of the holes 61 are completely occupied by respective sectors 63, which help define the surfaces 54 and are coupled to the plates 60 in an axially fixed position and in an angularly rotary manner. At the same time, the sectors 63 are coupled to the rotor 47 in an axially sliding manner and are caused to rotate 62 the axis 47 by the rotor 46.

With reference to FIG. 6, the remaining part of the surfaces 54 is defined by two metal walls 65, which join the upper ends of the plates 60 to the side ends of the tank 25 and are elastically deformable so as so adjust to the axial position of the plates 60. Preferably, the walls 65 are flexible and comprise respective upper portions 66, engaging respective vertical guides 67 arranged on the sides of the tank 25, and respective lower portions 68, which are connected to the portion 66 by means of a bending of the walls 65 and are fixed to the plates 60. The length and the inclination of the portions 68 and the position of the bending along the walls 65 vary according to the axial position of the plates 60.

As you can see in FIG. 7, on the front and rear side (namely, along the advancing direction W) the channel 55 is delimited by fixed surfaces or walls, which are indicated in general by reference number 70.

As far as the forming of the component to be obtained is concerned, with reference to FIG. 4 and as already mentioned above, for each cycle and, hence, for each layer of powder the melting is carried out by the emitter 15 in local areas selected by the control unit 16 based on the three-dimensional model stored. These areas are always arranged in the working space defined between the two barriers 40, including the strips 38.

As already explained for the strips 38, the locally melted powder solidifies and then forms a new horizontal section of the component to be obtained. At the same time, this horizontal section joined to the portion 17 arranged under it. The horizontal section that has just been formed has a thickness that substantially depends on she thickness of she layer of powder 22 that with deposited by the dispenser 14.

As shown in FIG. 5, after the melting step, the plate 13 is lowered by a predetermined height (arrow V) substantially corresponding to the thickness of the section that has just been formed, so as to take the upper surface of the residual powder 20 back to the fixed reference height (line Q).

At this point the dispenser 14 can start again, so as to deposit a new layer of powder (indicated by reference number 23) and begin a new cycle. Obviously, the cycles are repeated until the three-dimensional model stored in the control unit 16 is completed, namely up to completion of the missing portion 19.

At the end of the forming step the component is cooled down, advantageously by means of a flow of inert gas (for example argon or helium) introduced into the chamber 12, before being removed from the base plate 13. If necessary, other processing steps can be carried out, for example to remove possible powder remaining in possible cavities of the components and/or to remove possible tracks of the supports 18.

Owing to the above, the advantages of the dispenser 14 described herein are evident. First of all, the device allows the slit 26 so be partially shut, thus limiting the outlet of powder towards the portion 51, so as to reduce the consumption of powder during each cycle of the forming process depending on the actual distance between the barriers 40 and the strips 38, which define the actual working space in which the component is formed.

In other words, the device 50 allows the device 14 to adjust to the production of components having different widths, so as minimize the quantity of powder to be stored and deposited as much as possible.

At the same time, the particular configuration of the device 50 allows the powder to be channelled from the tank 25 up to the portion 51, reducing the passage section of the channel 55 according to the position of the end points 56 of the portion 51. At the same time, despite being movable, the surfaces 54 substantially avoid powder leaks from the channel 55.

The emitters 34 allow the strips 38 to be formed immediately after the passage of the levelling element 30, so that the emitter 15 can be exclusively dedicated to the forming of the component to be made.

Furthermore, the rollers 42 allow the path of the dispenser 14 to be guided so as to precisely align the portion 51 with the working space defined between the two barriers 40.

Finally, it is clear that the dispenser 14 described with reference to the accompanying drawings can be subject to changes and variations, without for this reason going beyond the scope of protection of the present invention, as defined in the appended claims.

In particular, according to simplified solutions (not show herein), wherein there are not provided rotors on the inside of the device 14, the device 50 can simply enable a progressive opening/closing of the ends 52 of the slit 26, for example by means of suitable valves and/or by means of horizontal closing devices, without changing the shape and/or the dimensions of the channel 55. In other words, in order to limit the length of the portion 51 and, therefore, save powder, it is possible to simply obstruct at leas one of the ends of the slit 26, so as to leave the portion open 51 with a length that is substantially equal to the distance between the barriers 40 that one wants to obtain.

Furthermore, the adjustment of the positions of the end points 56 of the portion 51 can be carried out during a cycle of the process, in case the distance between the two barriers 40 is variable along the trajectory of the device 14; or it can be carried out between one cycle of the process and the following one, so as to progressively narrow the distance between the two barriers 40 while moving upwards.

Finally, the rollers 42 can be replaced by a different centering system, for example by a system comprising one or more contactless sensors to detect the position of the underlying part of the barriers that has already been formed, and an automated control to adjust the position of the dispenser 14 in a direction orthogonal to the advancing direction W according to the signal provided by said sensors.

The invention claimed is:

1. A powder dispenser for making a component by additive manufacturing; the dispenser comprising:
   a lower opening, which comprises an outlet portion for letting said powder fall and is defined by a first size, which is measured along a horizontal axis, and by a second size, which is smaller than said first size and is measured along a horizontal direction orthogonal to said horizontal axis;

a vertical channel, which inferiorly ends at said outlet portion and, at the top, is adapted to communicate with a tank for receiving said powder;

wherein said dispenser comprises a shutter device for varying the length of said outlet portion with respect to the total length of said lower opening along said horizontal axis to partially shut said lower opening.

2. A dispenser according to claim 1, wherein said shutter device comprise at least a first element, which is movable so as to vary the position of an end point of said outlet portion along said horizontal axis; and an actuator device controlled so as to move said first element.

3. A dispenser according to claim 2, wherein said first element is sliding along a sliding axis parallel to said horizontal axis.

4. A dispenser according to claim 3, wherein said vertical channel is defined by a front surface, a rear surface, and two side surfaces, which face each another along said sliding axis; said first element being defined by one of said side surfaces.

5. A powder dispenser for making a component by additive manufacturing; the dispenser comprising:
a lower opening, which comprises an outlet portion for letting said powder fall and is defined by a first size, which is measured along a horizontal axis, and by a second size, which is smaller than said first size and is measured along a horizontal direction orthogonal to said horizontal axis;
a vertical channel, which inferiorly ends at said outlet portion and, at the top, is adapted to communicate with a tank for receiving said powder; wherein said dispenser comprises a shutter device for varying the length of said outlet portion with respect to the total length of said lower opening along said horizontal axis, wherein said shutter device comprise at least a first element, which is movable so as to vary the position of an end point of said outlet portion along said horizontal axis; and an actuator device controlled so as to move said first element, wherein the at least one first element is sliding along a sliding axis parallel to said horizontal axis, wherein said vertical channel is defined by a front surface, a rear surface, and two side surfaces, which face each another along said sliding axis; at least one first element being defined by one of said side surfaces, wherein said dispenser comprises a guide seat which extends along said sliding axis; at least one first element comprising a plate coupled in an axially sliding manner in said guide seat and so as to substantially sealingly separate said vertical channel from an axial end of said guide seat.

6. A dispenser according to claim 5, wherein said dispenser comprises:
the tank which communicates with the upper end of said vertical channel; and
at least a metal wall, which joins an upper end of said plate to a side end of tank and is elastically deformable to adapt to the axial movement of said plate.

7. A dispenser according to claim 2, wherein said shutter device further comprises a second element; said first and second elements being movable so as to respectively vary the positions of the end points of said outlet portion along said horizontal axis.

8. A dispenser according to claim 2, wherein said first element is defined by a closing element which is movable so as to open/close a corresponding end of said lower opening.

9. A dispenser according to claim 1, wherein said dispenser further comprises:
a levelling element arranged downstream of said lower opening, considering said horizontal direction;
two energy beam emitters, which are arranged downstream of said levelling element, considering said horizontal direction, are pointing downwards, are aligned with each another along a direction parallel to said horizontal axis, and are movable along said direction according to the length set for said outlet portion.

10. A dispenser according to claim 1, wherein said dispenser further comprises:
a levelling element arranged downstream of said lower opening, considering said horizontal direction;
at least one centering member arranged downstream of said levelling element, considering said horizontal direction, and designed so as to center the position of said dispenser with respect to two barriers which are formed during the additive manufacturing process; the at least one centering member being movable in a direction parallel to said horizontal axis according to the length set for said outlet portion.

* * * * *